Figure 1:
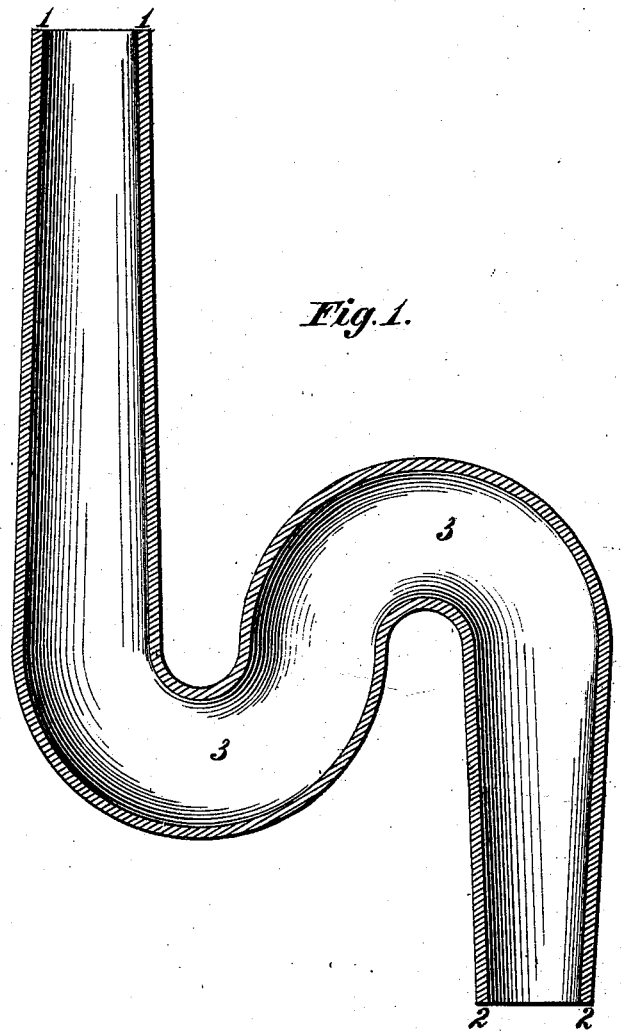

L. BRANDEIS.
STENCH-TRAP.

No. 172,865. Patented Feb. 1, 1876.

Witnesses.
Geo. T. Morris
Chas. J. Johnson

Inventor.
Ludwig Brandeis

UNITED STATES PATENT OFFICE.

LUDWIG BRANDEIS, OF BROOKLYN, NEW YORK, ASSIGNOR TO HIMSELF AND GUILIA BRANDEIS, OF SAME PLACE.

IMPROVEMENT IN STENCH-TRAPS.

Specification forming part of Letters Patent No. 172,865, dated February 1, 1876; application filed November 24, 1875.

*To all whom it may concern:*

Be it known that I, LUDWIG BRANDEIS, of Brooklyn, Kings county, New York, have invented a Safety-Trap, of which the following is a specification:

The subject of my invention is a trap or S-bend for water-closets, soil-pipes, &c., constructed, as fully described hereafter, to prevent the trap being rendered inoperative from the discharge of fluid, which frequently occurs in ordinary traps from their siphon-like action.

In the accompanying drawing, the figure represents, in section, the improved trap, 1 1 and 2 2 being the inlet and outlet branches, and 3 3 the S-bend.

In ordinary traps the branches are equal in diameter to or larger than the diameter of the S-bend, and as a result, the trap will, at times, act as a siphon, and allow a free passage for the gases through the bend, and discharge, through the branch 2 2, the water which should remain in the bend.

I have found by practical experiments and tests that, by reducing the size of the inlet and outlet branches, this siphon-like action of the trap is prevented to such an extent that the trap cannot be rendered inoperative under any ordinary conditions. This reduction in the size of the inlet is effected, preferably, by tapering each branch from its junction with the bend to the end, thus avoiding the stoppage of the trap, which will occur when shoulders are presented for the lodgment of particles of matter.

The reducing of the diameter of the inlet and outlet aids in preventing siphoning in another way, namely, by rendering it impossible to connect the trap carelessly to a waste-pipe larger in diameter than the bend.

I claim—

1. An S-trap, the bend of which is of a uniform diameter, exceeding that of the inlet and outlet, as specified.

2. A trap in which the bend is of uniform diameter, and the branches taper from their junction with the bend to their ends, as and for the purpose set forth.

LUDWIG BRANDEIS.

Witnesses:
GEO. H. MORRIS,
CHAS. J. JOHNSON.